United States Patent
Barbosa De Araujo et al.

(10) Patent No.: US 12,467,017 B2
(45) Date of Patent: Nov. 11, 2025

(54) MICROEMULSION SYSTEMS FOR EXTRACTION AND DISPLACEMENT OF OIL IN SANDSTONE ROCKS

(71) Applicants: PETROLEO BRASILEIRO S.A.—PETROBRAS, Rio de Janeiro (BR); UNIVERSIDADE FEDERAL DO RIO GRANDE DO NORTE, Rio Grande do Norte (BR)

(72) Inventors: Carolina Rayanne Barbosa De Araujo, Parnamirim (BR); Dennys Correia Da Silva, Natal (BR); Guilherme Mentges Arruda, Natal (BR); Marcos Allyson Felipe Rodrigues, Natal (BR); Alcides De Oliveira Wanderley Neto, Parnamirim (BR); Daniel Alberton Haas, Rio de Janeiro (BR); Leonardo Alencar De Oliveira, Rio de Janeiro (BR)

(73) Assignees: PETROLEO BRASILEIRO S.A.—PETROBRAS, Rio de Janeiro (BR); UNIVERSIDADE FEDERAL DO RIO GRANDE DO NORTE, Rio Grande Do Norte (BR)

( * ) Notice: Subject to any disclaimer, the term of this patent is extended or adjusted under 35 U.S.C. 154(b) by 938 days.

(21) Appl. No.: 17/540,727

(22) Filed: Dec. 2, 2021

(65) Prior Publication Data
US 2022/0348843 A1 Nov. 3, 2022

(30) Foreign Application Priority Data

Apr. 29, 2021 (BR) .......................... 1020210082119

(51) Int. Cl.
*C09K 23/42* (2022.01)
*B09C 1/10* (2006.01)
(Continued)

(52) U.S. Cl.
CPC ................ *C11D 1/721* (2013.01); *B09C 1/10* (2013.01); *C09K 23/42* (2022.01); *C11D 3/43* (2013.01);
(Continued)

(58) Field of Classification Search
CPC ....... C11D 1/721; C11D 3/43; C11D 17/0017; C11D 2111/14; C09K 23/42; B09C 1/10
See application file for complete search history.

(56) References Cited

U.S. PATENT DOCUMENTS 4,561,501 A 12/1985 Shaw et al.
2020/0332177 A1* 10/2020 Hill .......................... C09K 8/92

FOREIGN PATENT DOCUMENTS

BR 1020180685406 A2 3/2020
WO 2015093934 A1 6/2015

* cited by examiner

*Primary Examiner* — Jiangtian Xu
(74) *Attorney, Agent, or Firm* — RAPHAEL BELLUM PLLC

(57) ABSTRACT

The present invention provides for obtaining microemulsion formulations without the presence of an oil phase, and processes for making and using them for removing oil from solid surfaces, specifically sandstone rocks. The microemulsion formulations contain nonionic surfactants of different degrees of ethoxylation (lauryl alcohol with 10, 8 and 6 ethoxylation bonds), short-chain alcohol (1-butanol) and distilled water for the extraction of heavy crude oil impregnated in sandstone rocks. The formulations presented are capable of using low active matter compositions, unlike classical microemulsions which, in most cases, require a high amount of surfactant.

3 Claims, 3 Drawing Sheets

(51) Int. Cl.
*C11D 1/72* (2006.01)
*C11D 3/43* (2006.01)
*C11D 17/00* (2006.01)
(52) U.S. Cl.
CPC ....... *C11D 17/0017* (2013.01); *C11D 2111/14* (2024.01)

MICROEMULSION SYSTEMS FOR EXTRACTION AND DISPLACEMENT OF OIL IN SANDSTONE ROCKS

FIELD OF THE INVENTION

The present invention relates to new microemulsion formulations without the presence of a predominantly non-polar phase. More specifically, the present invention relates to a process for obtaining formulations containing lauril alcohol non-ionic surfactant, short-chain alcohol and distilled water, with application in the petroleum area, aiming its use for the extraction of petroleum from solid rock surfaces of sandstone.

BACKGROUND OF INVENTION

Different factors and conditions can cause oil to impregnate solid surfaces in an intense and often destructive manner. This process can occur naturally due to different pressure and temperature conditions or be caused by human accidents, such as oil spills on beaches or soils in general, causing damage to the rock formation and causing changes in wettability, in addition to generating high levels of toxicity for the ecosystem. Often, the treatment method used for oil extraction depends on the physicochemical characteristics of the soil or rock to be treated. Thus, the use of surfactants presents an expressive advantage due to their properties and simplicity of application, since they are amphiphilic molecules (polar head and non-polar tail) capable of decreasing the interfacial tension and changing the wettability of the actuation medium. However, the use of a surfactant solution alone is often not sufficient to remove considerable amounts of organic and/or inorganic pollutants from solid surfaces.

Classical microemulsion systems are relevant candidates for oil extraction from solid surfaces due to their low surface and interfacial tension. They are systems formed by two immiscible fluids, usually oil and water, stabilized by surfactant molecules, combined or not with a cosurfactant (short-chain alcohol). They have the characteristics of being thermodynamically stable and capable of solubilizing non-polar substances and therefore are widely used in the treatment of effluents, water and soil. However, classical microemulsions still have the disadvantage of being complex systems that, in general, require a considerable amount of alcohol to obtain significant single-phase regions and low viscosity for better performance. As a result, there is a risk that the constituents theeof may present some toxicity to the treatment medium if they are in high concentrations.

In patent literature, one can cite document BR 10 2018 068540 6 which relates to the formulation of washing pads for removing fluids of a non-polar nature from the wall of oil wells. They are pads developed from microemulsion systems, which comprise a mixture formed by 3 constituents: an aqueous phase (aqueous glycerin solution), a vegetable oily phase (pine oil) and a non-ionic surfactant (ethoxylated sorbitan monooleate 20-EO). The invention is characterized by removing the plaster formed by non-aqueous drilling fluids and, furthermore, restoring the wettability of the rock formation, which was altered by the non-aqueous drilling fluid, making it water-wettable again.

Patent document U.S. Pat. No. 4,561,501A describes the recovery of oil from a subsurface earth formation injecting a microemulsion system containing a polyvalent metal carboxylate as a surfactant, a cosurfactant and an electrolyte in suitable concentrations and proportions to form the multiphase system with the oil from the reservoir. The inventors thus highlighted a new microemulsion system capable of removing significant amounts of oil from the soil in the presence of alcohol with at least five carbon atoms as a cosurfactant.

The patent document WO2015093934A1 relates to a method of cleaning oily solid particles containing heavy crude oil by means of an emulsified composition containing light hydrocarbon in the presence of a basic solution to displace the crude oil trapped on the surface of the solid particles. The emulsified composition comprised a surfactant of 2% to 40% by weight of the total composition selected from glyceryl-based alkyl polyglycosides, polyglyceryl, sucrose, sorbitol fatty add esters, sulphofatty add methyl esters, acylated amino adds, acyl glutamates, acyl glycinates, acyl alaninates, lauroyl sarcosinate, nopolyalkoxylates; a cosurfactant from 1% to 30% by weight of the total composition, consisting of C3-C18 alcohols, lecithins, C3-C18 fatty acids, dials, amino acids and any mixtures thereof; an oily phase from 15% to 90% by weight of the total composition; and an aqueous phase in 0.5% to 20% by weight of the total composition.

Some recent studies in the literature address methods of obtaining microemulsion systems in a more simplified way in connection with conventional microemulsions, but with significant limitations. There is the occurrence of microemulsion systems without the presence of alcohol, obtaining good thermodynamic stability, but with high viscosity, which reduces the propagation of these systems on solid surfaces. There are also reports of surfactant-free microemulsion systems in order to validate that systems of this type often have the same characteristics and properties of a classical microemulsion containing surfactant. However, these systems, in their natural form, are not able to change the wettability of the contact medium, an extremely important phenomenon to increase oil removal from the solid surface, requiring low salinity, alkaline medium or surfactants to change the wettability.

So far, no reports have been found on microemulsion systems formed only by surfactant, cosurfactant (predominantly non-polar) and aqueous phase for removing heavy crude oil from sandstone. These systems have never been used or tested for the remediation of solid surfaces contaminated by oil, therefore, presenting themselves as innovative alternatives. In these microemulsion systems, the oily phase can be represented by the cosurfactant itself, which, due to its non-polarity, can migrate from the interface to the interior of the micelle or even to the continuous phase, forming direct or reverse micelles, respectively. Sandstone rocks were used as an inert because they exist in abundance in areas such as the oil basins in Northeast Brazil, and adsorption of oil on this rock is common.

DESCRIPTION OF THE INVENTION

As a preferred way of carrying out the invention, among the various possible compositions of constituents for the microemulsion without oil phase, it is established, for this patent, that the following proportions of the system components are used: from 0.01% to 5% of lauryl alcohol, preferably from four to twelve ethoxylated bonds; from 0.01% to 5% of a short-chain alcohol, preferably ethanol, propanol and butanol; and from 90% to 99.98% aqueous phase, preferably water.

The order of reagents in the preparation of formulations can be done randomly. The mixture of constituents to obtain these systems should be carried out by mechanical agitation at a maximum speed of 1,000 rpm over time until a single clear phase is ensured.

For application of the system, in the case of microemulsions containing the surfactant lauryl alcohol with twelve to five ethoxylated bonds, it is preferable that the extraction system be placed under high temperatures (between 40° C. and 60° C.), long contact time (3 h to 4 h) and 20 mL to 40 mL. of microemulsion to be applied to every 1 g of contaminated rock.

For application of the system, in the case of microemulsions containing the lauryl alcohol surfactant from six to four ethoxylated bonds, it is preferable that the extraction system be placed at low temperatures (between 20° C. to 40° C.), low contact time (1 h 2 h) and 5 mL to 20 mL of microemulsion to be applied to every 1 g of contaminated rock.

RESULTS OBTAINED

Three microemulsion systems were obtained using distilled water as aqueous phase, 1-butanol as amphisolvent (co-surfactant) and ethoxylated lauric alcohol with ten, eight and six ethoxylated groups (LA 10EO, LA 8EO and LA 6EO, respectively) as surfactants. A conventional oily phase was not used because 1-butanol could perform a role similar to that of an oily phase as it is a predominantly non-polar molecule.

A composition of the single-phase region of each microemulsion system was chosen to be the extraction solvent. To delimit the area of that region, a volumetric titration analysis was used to determine the Winsor regions in pseudoternary diagrams. For this, nine mixtures of different compositions of surfactants and aqueous phase ($X_T+X_{FA}$=2 g, 10% to 90% by weight of surfactant) were titrated dropwise with alcohol until the transition from clear to cloudy appearance was achieved in a test tube. The same procedure was carried out with nine mixtures of different compositions of surfactant and co-surfactant ($X_T+X_C$=2 g, 10% to 90% by weight of surfactant) and titration with aqueous phase.

Figure 1:
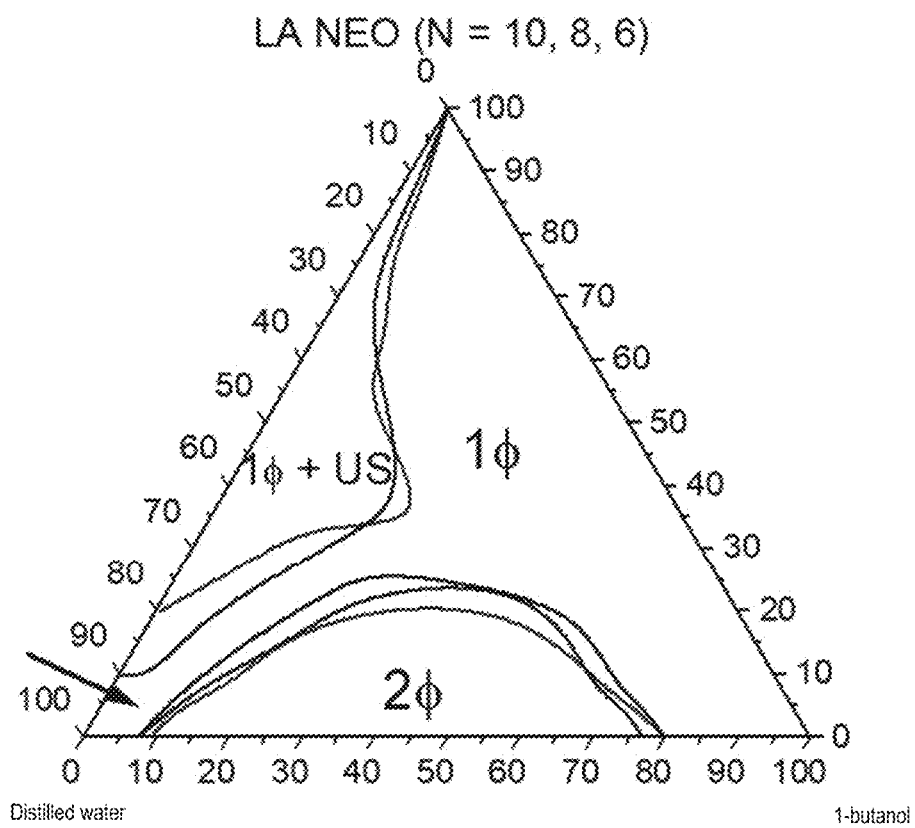
FIG. 1 shows the ternary diagram obtained from the combination of different mass compositions of the three components of the systems (surfactants, alcohol and water) and the phases found.

FIG. 1 shows the three ternary diagrams obtained and condensed into a single diagram. When observing the diagram, two biphasic regions are perceived, one of which is characterized by the solubilization of the three constituents (water, butanol and surfactant) with an excess of surfactant (1φ+US), since this molecule has a solubility limit in aqueous media, with the exception of LA 6EO, which requires little water molecule for its complete hydration due to the smaller amount of ethoxylated groups; while the other region is characterized by the insufficient amount of surfactants to form micelles, causing the separation of water and butanol solvents (2φ). The single-phase region (1φ) represents the largest area of the diagram. We made the option for the formulation of a single-phase chemical system rich in water and, consequently, with a low percentage of alcohol and surfactant. The formulation contains 90% water, 5% butanol and 5% surfactant. This composition is illustrated in FIG. 1.

The micellar diameter (±0.3 standard deviation) was 12 nm to 14 nm for the formulation containing LA 10EO, 20 nm to 25 nm for the formulation containing LA 8EO and 40 nm to 45 nm for the formulation containing LA 6EO. Micellar diameter increases as the degree of ethoxylation of surfactants decreases. This was expected because the more predominantly non-polar the surfactant, the more alcohol will be encapsulated in the micellar nucleus, which increases the size of the aggregate. All value ranges are as expected for microemulsion systems according to the literature.

The surface tension values of the microemulsion formulations were: 29.12 mN.m$^{-1}$ to 30 mN.m$^{-1}$ for the formulation containing LA 10EO; 28.32 mN.m$^{-1}$ to 29 mN.m$^{-1}$ for the formulation containing LA 8EO and 27.68 mN.m$^{-1}$ to 27.90 mN.m$^{-1}$ for the formulation containing LA 6EO. This slight decrease in surface tension values with the decrease in the degree of ethoxylation was expected, as the lower the degree of ethoxylation, the greater the migration of surfactant molecules to the liquid-gas interface, significantly decreasing the surface tension, as already reported in literature, As a way to test the present invention, Botucatu sandstone rocks (RN/Brazil) were broken and their particles separated in granulometric sieves from 100 mesh to 150 mesh to obtain grains of uniform size.

The contamination of the rocks consisted of the addition of heavy oil to the dry sandstone rocks in the proportion of 1:10 by weight. The mixture was stirred in the presence of an ultrasonic bath, in order to obtain a good homogenization between the oil and the rocks, as well as to avoid oil impregnation on the container walls. Next, the mixture was spread on a tray and covered with aluminum foil, with small openings made to allow ventilation. Finally, the mixture was placed in an oven at a temperature of 40° C. to 50° C. for 4 h to 5 h, for better oil impregnation. The entire process was controlled via mass balance with minimal oil losses during heating (0.12% to 0.15%), which was neglected in the final calculations.

Between 1 g and 1.2 g of oil-contaminated sandstone was added to a 250 mL Erlenmeyer flask. Then, an amount of microemulsion was added, in volume, according to the experimental design. The samples were placed in a thermostatic bath under constant stirring of 50 rpm. After reaching the desired contact time, a filtration (14 µm, φ=11 cm) was performed to separate the treated rock grains from the solvent carrying the extracted oil.

Figure 2:
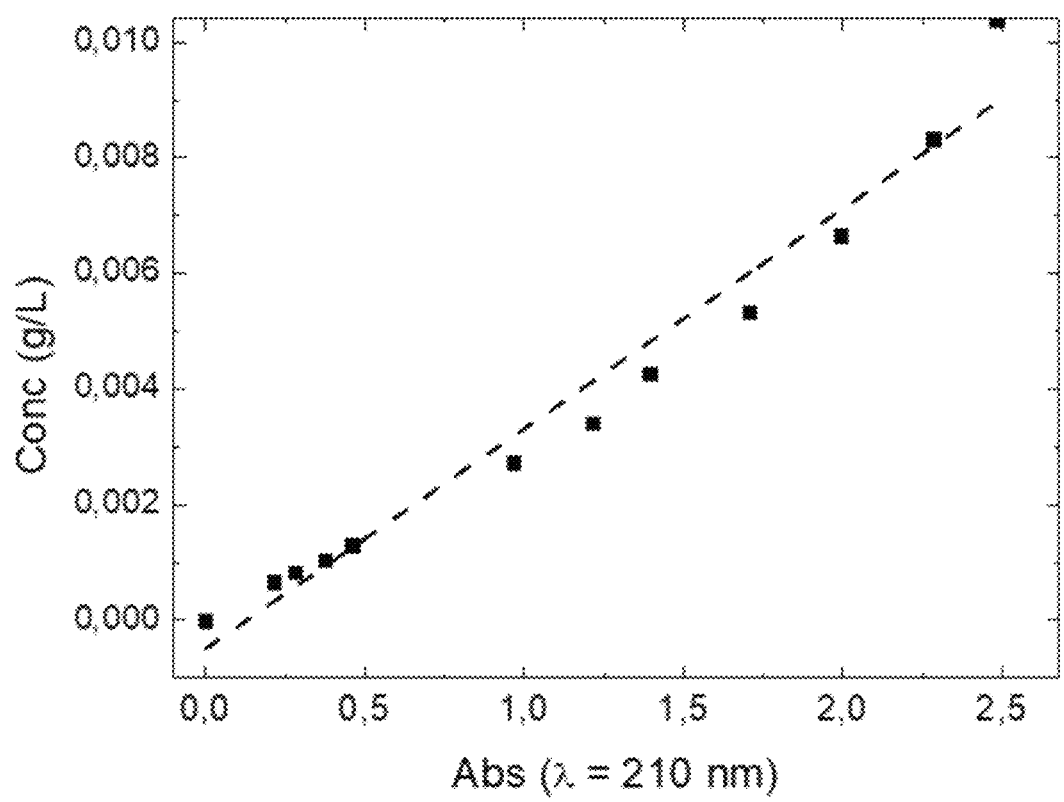
FIG. 2 shows the calibration curve obtained to quantify the oil extracted and present in the microemulsion with the aid of ultraviolet spectroscopy (UV-Vis).

The quantification of the oil content in the microemulsion was performed with the aid of UV-Vis spectroscopy. A spectrum scan was performed and the wavelength with the highest absorbance (A) was between 190 nm and 210 nm. The absorbance values were converted into the concentration of oil present in the microemulsion by means of a previously obtained calibration curve, which was constructed from the addition of a fixed amount of oil to different volumes of microemulsions, and these mixtures were analyzed by absorbance. FIG. 2 shows the calibration curve representing the amount of petroleum solubilized in the microemulsion as a function of absorbance values. The calibration equation (Equation 1) presented a coefficient of determination $R^2$=0.984, thus showing a good adjustment of the experimental data.

$$C=0,0035.(Abs)-0,0003 \quad \text{(Eq. 1)}$$

It is known that, depending on the external or operating conditions of the system, surfactants can change their hydrophilic-lipophilic (HLB) nature, becoming more polar, which reduces the interaction with oil, or extremely non-polar, which can cause adsorption of the surfactants in the rock and, by affinity, remove the oil through its encapsulation inside the micelle. To study the efficiency of the solid-liquid extraction process, the following variables were selected: volume of the microemulsion system used ($V_{MES}$ mL), bath temperature (T, °C.) and solvent-to-feed contact time (t, h). The density of all microemulsion systems was 1 g/mL. To investigate the effects of these variables and optimize the process, an experimental $2^3$ factorial design was carried out with three repetitions at the central point. The response variable was the oil extraction efficiency (% EE) from the rock (Equation 2). All tests were performed in duplicate. Table 1 shows the levels of each factor.

$$EE(\%) = \frac{(m_0)_F - (m_f)_R}{(m_0)_F} \quad \text{(Eq. 2)}$$

TABLE 1

Levels assumed by the influence parameters
in the solid-liquid extraction process.

| | Levels | | |
|---|---|---|---|
| Variables | −1 | 0 | 1 |
| $V_{MES}$ (g) | 20 | 30 | 40 |
| Temperature (° C.) | 27 | 43.5 | 60 |
| Contact time (h) | 1 | 2.5 | 4 |

Table 2 presents the values of extraction efficiency (% EE) of oil, showing percentages between 3.680±0.933% and 99.8±0.266%, proving that the variables ($V_{MES}$, T et) directly interfere with the extraction process. However, it is clear that the decrease in the degree of ethoxylation is decisive to increase the extraction efficiency. This is due to the predominance of the non-polar tail in relation to the head, which reduces its structure, making the LA 6EO more suitable for interacting with the non-polar solute.

TABLE 2

Results of planning experiments for oil extraction efficiency (% EE).

| | Variables | | | EE (%) | | |
|---|---|---|---|---|---|---|
| Assays | $V_{MES}$ (g) | T (° C.) | t (h) | LA EO10 | LA EO8 | LA EO6 |
| 1 | 20 | 27 | 1 | 4.220 ± 0.631 | 14.318 ± 0.206 | 99.800 ± 0.266 |
| 2 | 40 | 27 | 1 | 4.154 ± 0.015 | 14.413 ± 0.604 | 87.440 ± 0.212 |
| 3 | 20 | 60 | 1 | 9.057 ± 0.280 | 9.789 ± 0.491 | 75.240 ± 0.207 |
| 4 | 40 | 60 | 1 | 10.916 ± 0.870 | 18.253 ± 0.179 | 57.505 ± 0.112 |
| 5 | 20 | 27 | 4 | 3.680 ± 0.933 | 13.523 ± 0.169 | 59.283 ± 0.267 |
| 6 | 40 | 27 | 4 | 3.913 ± 0.331 | 10.347 ± 0.120 | 20.973 ± 0.220 |
| 7 | 20 | 60 | 4 | 10.756 ± 0.098 | 21.571 ± 0.104 | 77.688 ± 0.132 |
| 8 | 40 | 60 | 4 | 15.065 ± 0.114 | 26.678 ± 0.334 | 34.745 ± 0.388 |
| 9 | 30 | 43.5 | 2.5 | 7.719 ± 0.342 | 16.851 ± 0.781 | 64.748 ± 0.783 |
| 10 | 30 | 43.5 | 2.5 | 7.792 ± 0.319 | 16.224 ± 0.354 | 64.504 ± 0.715 |
| 11 | 30 | 43.5 | 2.5 | 7.156 ± 0.334 | 16.772 ± 0.334 | 64.129 ± 0.132 |

It is possible to notice that the surfactants LA 10EO and LA 8EO had higher oil extraction values when they were in larder volumes of microemulsion, higher temperature and longer contact time. The percentage of oil extraction is increased with the increase in the volume of the microemulsion, since more micelles are found in the medium, which allows the encapsulation of larger amounts of oil in the micellar nuclei.

Also for LA 10EO and LA 8EO, the percentage of oil extraction increases with increasing temperature. The increase in temperature makes the surfactants more non-polar, which provides greater contact between the micelles and the oil adsorbed with the rock and, therefore, more oil is removed. Furthermore, the increase in temperature causes greater collisions of micelles with the rock, which increases oil capture. Another important phenomenon is the decrease in the surface tension of the microemulsion, which reduces the interfacial tension between this system and the oil, and thus facilitates the encapsulation of oil in the micelle. All these phenomena make the surfactants LA 10EO and LA 8EO improve their percentages in oil removal.

For LA 6EO, the best extractions occur in smaller microemulsion volume, lower temperature and shorter contact time. In this case, the increase in the volume of the microemulsion caused a reduction in the percentage of oil removal, which shows the interference of another phenomenon. Among the surfactants, LA 6EO is the one with the greatest affinity to oil and, therefore, should have the highest percentage of extraction. However, this surfactant is also more easily adsorbed by the rock, which allows the oil to return to the rock because it is solubilized inside the micelle. Consequently, for larger volumes of microemulsion, the microemulsion/rock ratio is increased, which increases the possibility of more micelles being adsorbed by the rock. Thus, the extraction efficiency ends up being higher when there is a smaller volume of microemulsion. This phenomenon of adsorption of non-ionic surfactants due to HLB was identified by several studies in the literature, which corroborates the results obtained here, Also for the LA 6EO, the increase in temperature further decreased the percentage of extraction, as the increase in temperature decreases the solubility of the surfactant in the medium, contributing to its migration and adsorption into the rock surface. This adsorption phenomenon due to the increase in temperature is more evident when there is a greater volume of microemulsion, because in this case the amount of adsorbed surfactant increases even more, which justifies the decrease in the percentage of oil extraction.

The percentage of oil extraction increases with increasing stirring time. The longer the stirring time, the greater the possibility of the micelles colliding with the rock, which facilitates the incorporation of oil into the micelle core and, thus, increases the efficiency of the surfactants LA 10EO and LA 8EO. For LA 6EO, the increase in stirring decreases the percentage of oil extraction, as the surfactant is adsorbed into the rock right after the oil is removed, as already mentioned. Thus, the longer the stirring time, the longer the micelles contact with the rock, favoring the return of oil to the rock.

After obtaining the results of the statistical analysis of the experimental design, the best operational conditions (microemulsion volume, temperature and contact time) for oil extraction for each formulation, containing the surfactants used, were grouped into an operational condition called the optimal point, which were chosen for each system to continue the study in order to assess the efficiency of a cross-current process using the microemulsion as feed (carrying capacity of the microemulsion in relation to oil).

Table 3 shows the results of the load capacity of microemulsions and the surface tension values of each filtrate, as a way to monitor the stability of the microemulsions. All systems were efficient in removing oil until the third extraction. From the fourth attempt on, the microemulsion was broken, generating two phases (microemulsion and co-surfactant), which made it impossible to quantify the oil removed.

TABLE 3

Carrying capacity of petroleum extraction by microemulsions in three stages.

| | LA 10EO | | LA 8EO | | LA 6EO | |
|---|---|---|---|---|---|---|
| Assay | EE (%) | Surface tension (mN/m) | EE (%) | Surface tension (mN/m) | EE (%) | Surface tension (mN/m) |
| 1 | 15.065 ± 0.114 | 29.12 | 26.678 ± 0.334 | 28.32 | 99.98 ± 0.266 | 27.68 |
| 2 | 12.959 ± 0.938 | 29.92 | 15.065 ± 0.398 | 29.92 | 48.237 ± 0.874 | 28.39 |
| 3 | 8.317 ± 0.182 | 31.36 | 10.608 ± 0.182 | 31.49 | 4.825 ± 0.945 | 29.24 |

However, it should be noted that even after its imbalance, the microemulsion still continued to extract oil from the rock, which no longer occupies the micelle nucleus (since it is already saturated), but rather as an excess phase of the microemulsion. This behavior was already expected, as the authors had already demonstrated in previous studies.

Figure 3:
FIG. 3 shows the physical appearance of microemulsions after oil extraction, with an increase in color with each extraction, which shows the continuous removal of oil.

After each reuse, the microemulsions had their surface tension values increased, indicating that the surfactants are not migrating to the liquid-gas interface, but to the liquid-liquid interface (oil and continuous phase of the microemulsion), which justifies the packaging of oil by micelles. In addition, an increase in the color of the microemulsion was noted after its reuse, which indicates a greater amount of extracted oil, as seen in FIG. 3.

EXAMPLES OF EMBODIMENTS OF THE INVENTION

To evaluate the oil extraction efficiency by microemulsions, the systems were compared to micellar solutions widely used in the literature and containing the same percentage of surfactant. Table 4 illustrates the extraction efficiency values for microemulsions and surfactant solutions. For all analyzed situations, the microemulsion showed a higher percentage of oil removal efficiency than the surfactant solutions. The presence of butanol makes the microemulsion a more non-polar formulation, which facilitates the action of the surfactant in oil removal and, thus, justifies the greater extraction action by microemulsions. The evaluation of surfactant solutions elucidates how decisive the surfactant structure is for the oil extraction process, making it clear that the smaller the amount of ethoxylate group, the greater its affinity for nonpolar fluids, resulting in greater extraction.

TABLE 4

Results of petroleum extraction using micellar solution and microemulsion.

| | EE (%) | |
|---|---|---|
| Surfactant | Micellar solution | Microemulsion |
| LA EO10 | 6.387 ± 0.087 | 15.065 ± 0.114 |
| LA EO8 | 8.522 ± 0.279 | 26.678 ± 0.334 |
| LA EO6 | 78.754 ± 0.129 | 99.800 ± 0.266 |

The invention claimed is:

1. A method of making a microemulsion formulation, the method comprising mechanically stirring the microemulsion formulation at a speed of up to 1,000 rpm until a single clear phase is formed, wherein the microemulsion formulation consists of a non-ionic surfactant lauryl alcohol ethoxylate in a concentration ranging from 0.01% to 5%, a short-chain alcohol in a concentration ranging from 0.01% to 5%, and water in a concentration ranging from 90% to 99.98%.

2. The method of claim 1, wherein the non-ionic surfactant lauryl alcohol ethoxylate has from four to twelve ethoxylated bonds.

3. The method of claim 1, wherein the short-chain alcohol is ethanol, propanol, or butanol.

* * * * *